(12) United States Patent
Shima

(10) Patent No.: US 10,109,249 B2
(45) Date of Patent: Oct. 23, 2018

(54) DISPLAY DEVICE

(71) Applicant: Japan Display Inc., Minato-ku (JP)

(72) Inventor: Takehiro Shima, Tokyo (JP)

(73) Assignee: Japan Display Inc., Minato-ku (JP)

(*) Notice: Subject to any disclaimer, the term of this patent is extended or adjusted under 35 U.S.C. 154(b) by 0 days.

(21) Appl. No.: 15/478,692

(22) Filed: Apr. 4, 2017

(65) Prior Publication Data

US 2017/0294171 A1   Oct. 12, 2017

(30) Foreign Application Priority Data

Apr. 8, 2016   (JP) ................................ 2016-078119

(51) Int. Cl.
| | |
|---|---|
| *G06F 1/00* | (2006.01) |
| *G09G 3/36* | (2006.01) |
| *G02F 1/1368* | (2006.01) |
| *G02F 1/1343* | (2006.01) |
| *G02F 1/1362* | (2006.01) |

(52) U.S. Cl.
CPC ......... *G09G 3/3648* (2013.01); *G02F 1/1368* (2013.01); *G02F 1/134309* (2013.01); *G02F 1/136286* (2013.01); *G02F 2201/123* (2013.01); *G09G 2300/0426* (2013.01); *G09G 2310/08* (2013.01)

(58) Field of Classification Search
CPC .......... G09G 3/30; G09G 3/36; G09G 3/3688; G09G 3/3666; G09G 3/3667
See application file for complete search history.

(56) References Cited

U.S. PATENT DOCUMENTS

| | | | |
|---|---|---|---|
| 2009/0102758 A1 | 4/2009 | Anzai et al. | |
| 2016/0019856 A1* | 1/2016 | Tanaka | G09G 3/3648 345/206 |
| 2016/0307534 A1* | 10/2016 | Wu | G09G 3/3688 |

FOREIGN PATENT DOCUMENTS

JP   2009-122636   6/2009

* cited by examiner

*Primary Examiner* — Michael Faragalla
(74) *Attorney, Agent, or Firm* — Oblon, McClelland, Maier & Neustadt, L.L.P.

(57) ABSTRACT

According to one embodiment, a display device includes substrates with pixels, a pixel electrode in each of the pixels, a display select circuit connected to the electrode, which supplies display and non-display voltages, a power line to which first and second voltages are supplied, a memory device connected to the power line and the display select circuit, a voltage select circuit which selects a voltage to be supplied to the power line from the first and second voltages, and a clock circuit which generates a clock signal. The memory device controls the display select circuit using the first and second voltages, and the first voltage select circuit selects the first or second voltages in synchronism with the clock signal.

20 Claims, 8 Drawing Sheets

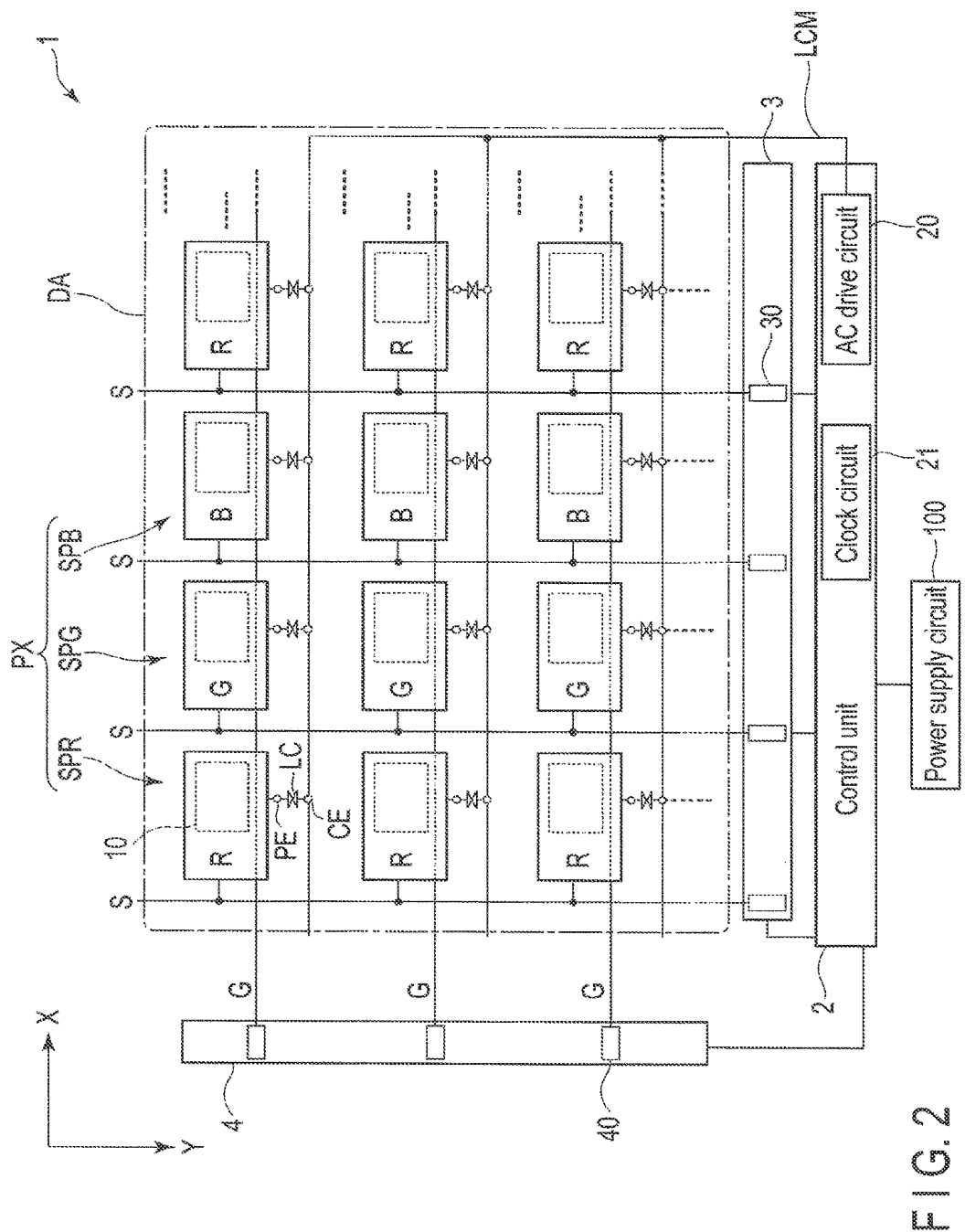
F I G. 2

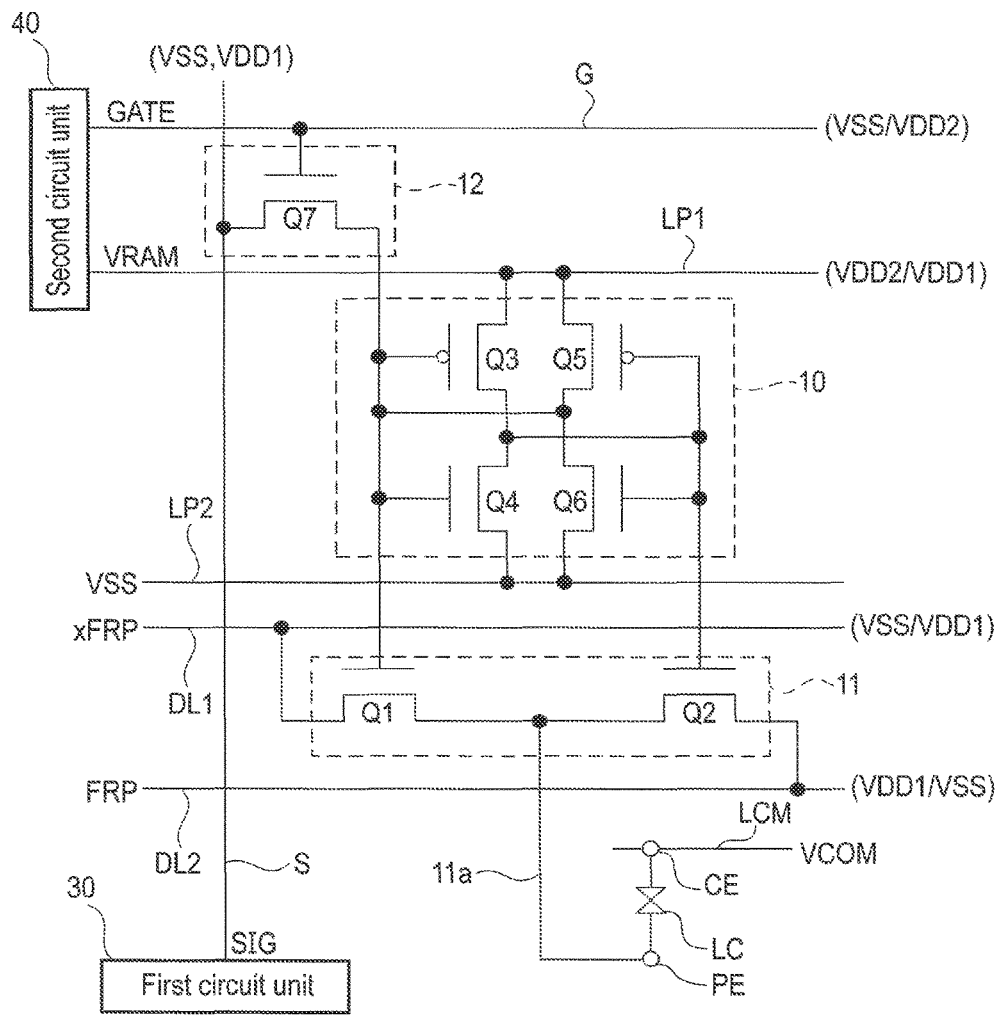
F I G. 3

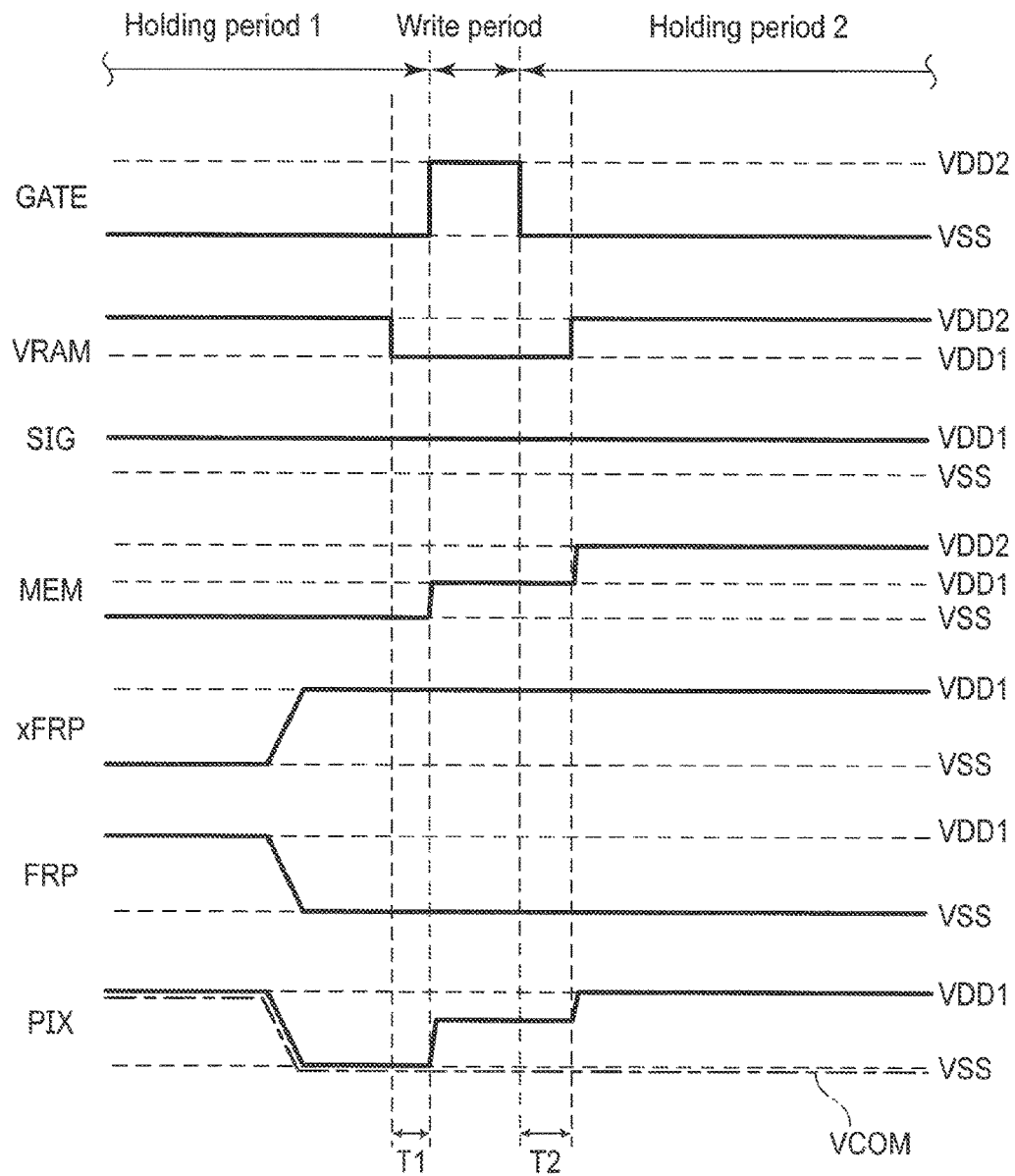
F I G. 4

DISPLAY DEVICE

CROSS-REFERENCE TO RELATED APPLICATIONS

This application is based upon and claims the benefit of priority from Japanese Patent Application No. 2016-078119, filed Apr. 8, 2016, the entire contents of which are incorporated herein by reference.

FIELD

Embodiments described herein relate generally to a display device.

BACKGROUND

Display devices including memories each arranged for each respective pixel in the display area are known. Display devices of this type write a digital signal according to an image to be displayed to each respective memory and supply a voltage corresponding to the digital signal stored in each respective memory to each respective pixel, thereby displaying the image on the display area. Such a system is called, for example, the digital mode.

A display device of the digital mode requires a switching element used for a memory device, a switching element for writing a digital signal to a memory device, and a switching element for selecting a signal to be supplied to a pixel electrode, and the like. When all of these switching elements are used formed from CMOS transistors, the number of transistors required for the circuits increases extremely. As a result, it is difficult to further improve the definition of the display device.

BRIEF DESCRIPTION OF THE DRAWINGS

FIG. 2 is a diagram showing an example of circuits of the display device.

FIG. 3 is a diagram showing an example of a circuit of a sub-pixel of the display device.

FIG. 4 is a timing chart illustrating an example of operation of the display device.

DETAILED DESCRIPTION

Figure 1:
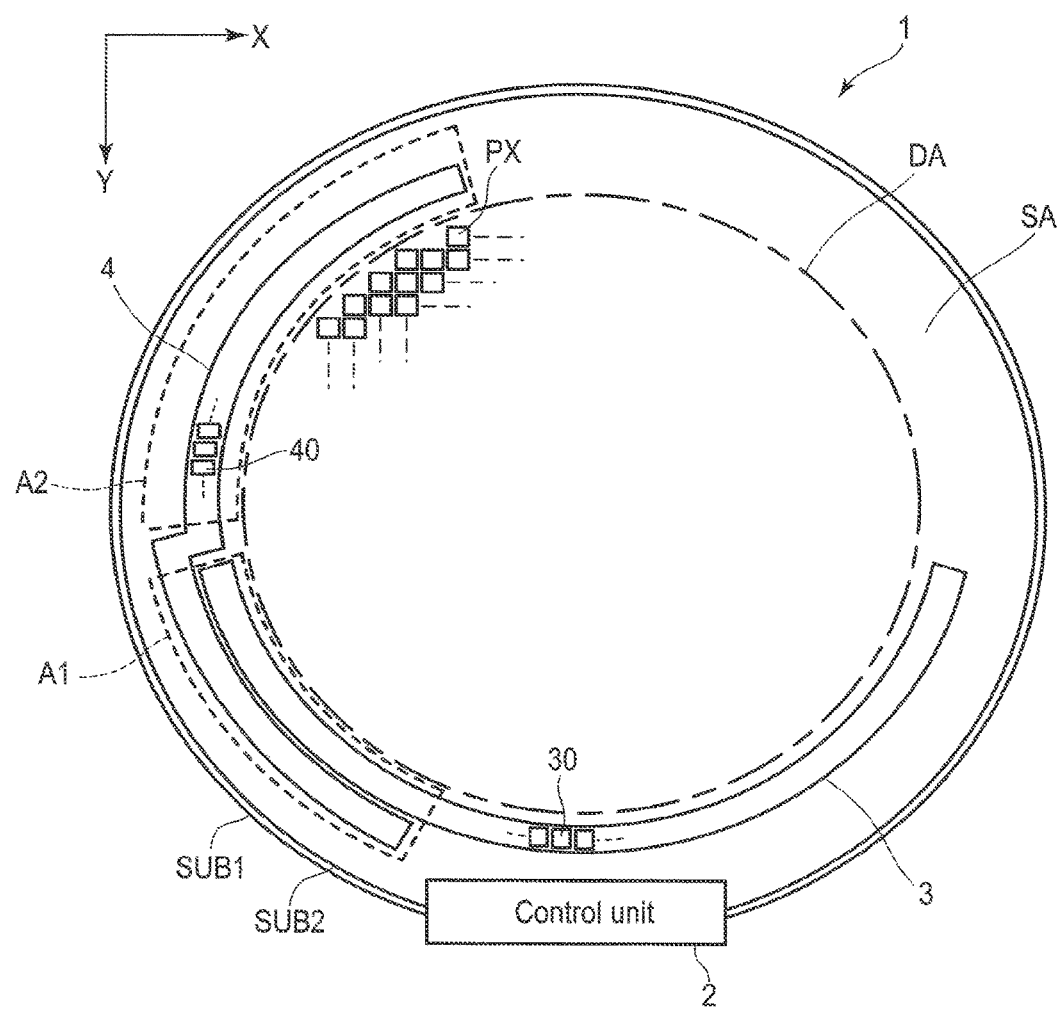
FIG. 1 is a plan view showing an example of the structure of a display device according to one embodiment.

In general, according to one embodiment, a display device comprises: a pair of substrates each including a display area where a plurality of pixels are arranged; an electro-optical layer located between the pair of substrates; a pixel electrode provided in each of the plurality of pixels; a display select circuit connected to the pixel electrode, which selectively supplies a display voltage and a non-display voltage to the pixel electrode; a first power line to which a first voltage and a second voltage are supplied; a memory device connected to the first power line and the display select circuit; a first voltage select circuit which selects a voltage to be supplied to the first power line from the first voltage and the second voltage; and a clock circuit which generates a clock signal. The memory device controls the display select circuit using the first voltage and the second voltage, and the first voltage select circuit selects the first voltage or the second voltage in synchronism with the clock signal.

According to another embodiment, a display device comprises: a pair of substrates each including a display area in which a plurality of pixels are arranged; an electro-optical layer located between the pair of substrates; a pixel electrode provided in each of the plurality of pixels; a display select circuit connected to the pixel electrode, which selectively supplies a display voltage and a non-display voltage to the pixel electrode; a first power line to which a first voltage and a second voltage are supplied, a memory device connected to the first power line and the display select circuit; a plurality of signal lines to which a voltage to be stored in the memory device is supplied; a switching element located between the signal line and the memory device; and a first voltage select circuit which selects a voltage to be supplied to the first power line, from the first voltage and the second voltage. The memory device stores, in a write period when the switching element is on, the voltage supplied to the signal line, and the memory device controls, in a holding period when the switching element is off, the display select circuit according to the voltage stored. The first voltage select circuit supplies the first voltage to the first power line in the write period, and the second voltage to the first power line in the holding period.

An embodiment will be explained with reference to accompanying drawings.

Note that the disclosure is presented for the sake of exemplification, and any modification and variation conceived within the scope and spirit of the invention by a person having ordinary skill in the art are naturally encompassed in the scope of invention of the present application. In addition, in some cases, in order to make the description clearer, the drawings may be more schematic than in the actual modes, but they are mere examples, and do not limit the interpretation of the present invention. In some cases, in each of the drawings, reference numbers of identical or similar elements, which are successively disposed, are omitted. In the specification and drawings, components that fulfill same or similar functions are denoted by the same reference numeral and their overlapping descriptions may be omitted.

In the present embodiment, a liquid crystal display device with detection function is disclosed as an example of the display device. However, each embodiment does not prevent application of individual technical ideas disclosed in the embodiment to other types of display devices. As these display device, for example, a self-luminous display device comprising an organic electroluminescent (EL) display element, or an electronic-paper type display device comprising a electrophoretic element may be considered.

Further, unless otherwise indicated in particular, such expressions used in this specification as "α includes A, B or C", "a includes either A, B or C" and "α includes one selected from the group consisting of A, B and C" do not exclude the cases where a includes a plurality of combinations of A to C. Furthermore, these expressions do not exclude the cases where a includes some other element or elements.

FIG. 1 is a plan view showing an example of the brief structure of a display device 1 of the present embodiment. The display device 1 comprises a first substrate SUB1 and a second substrate SUB2 opposing each other. Between the substrates SUB1 and SUB2, a liquid crystal layer (liquid crystal layer LC, which will be described later) is sealed. This liquid crystal layer is an example of an electro-optical layer. Other examples of the electro-optical layer are organic EL devices, electrophoretic elements, described above and micro-electro-mechanical-systems (MEMS) shutter elements. The display device 1 may be of a reflective type which displays images by utilizing external light or the light from a front light or a transmissive type which displays images by utilizing the light from a backlight.

The display device 1 comprises a display area DA and a peripheral area SA surrounding the display area DA. In the display area DA, a great number of pixels PX are arranged in a matrix along a first direction X and a second direction Y. The first direction X and the second direction Y cross, for example, perpendicularly each other. The peripheral area SA is equivalent to the region outside of the display area DA of the area where the substrates SUB1 and SUB2 overlap each other. The peripheral area SA is shielded by a light-shielding layer formed in the second substrate SUB2, for example.

In the example of FIG. 1, the display area DA has a circular shape. Note that the display area DA may be of some other shape such as elliptical, polygonal or a shape that at least partially includes a curvy outline. Further, in the example of FIG. 1, the substrates SUB1 and SUB2 and the peripheral area SA are also circular in shape, but they may be of some other shape as in the case of the display area DA.

The display device 1 further comprises a control unit 2 (controller), a first driver unit 3 containing a plurality of first circuit units 30 and a second driver unit 4 containing a plurality of second circuit units 40. The control unit 2 is an integrated circuit mounted, for example, in the first substrate SUB1, and functions as a signal supply source which outputs various kinds of signals required for display of images based on image data entered from outside. Note that the control unit 2 may be connected to these substrates through flexible wiring boards or the like, without being mounted in the first substrate SUB1 or the second substrate SUB2.

The first driver unit 3 and the second driver unit 4 are formed in, for example, the first substrate SUB1 in the peripheral area SA. In the example of FIG. 1, the first driver unit 3 has an arc shape formed along a lower edge (the edge by the control unit 2 side) of the display area DA. The second driver unit 4 also has an arc shape formed along a left edge of the display area DA. The first driver unit 3 may be referred to as a horizontal driver, a signal-line drive circuit, or a source driver. The second driver unit 4 may be referred to as a vertical driver, a scanning-line drive circuit, or a gate driver.

The peripheral area SA includes a first area A1 and a second area A2. In the first area A1, part of the first driver unit 3 (at least one first circuit unit 30) is located between the second driver unit 4 and the display area DA. On the other hand, in the second area A2, the first driver unit 3 is not located between the second driver unit 4 and the display area DA.

FIG. 2 show a brief circuit structure of the display device 1. For simplification, the display area DA is illustrated in a rectangular shape and each of the driver units 3 and 4 is illustrated in a straight line. In this embodiment, each pixel PX comprises sub-pixels SP of red, (R) green (G) and blue (B). Hereafter, red, green and blue sub-pixels SP are referred to as sub-pixel SPR, SPG and SPB, respectively. Note that in this specification, a sub-pixel SP may be referred to simply as a "pixel".

In the example of FIG. 2, sub-pixels SPR, SPG and SPB included in one pixel PX are arranged along the first direction X. But, the layout of the pixels PX is not limited to that of the example of FIG. 2. For example, a pixel PX may further include a sub-pixel SP of some other color such as white (W). Further, a pixel PX may include a plurality of sub-pixels SP of the same color.

The display device 1 comprises a plurality of signal lines S and a plurality of scanning lines G. The signal lines S and the scanning lines G are formed on the first substrate SUB1. Each signal line S is connected to the respective first circuit unit 30 corresponding thereto. Each scanning line G is connected to the respective second circuit unit 40 corresponding thereto. The signal lines S extend out along the second direction Y to the display area DA and they are arranged along the first direction X. The scanning lines G extend out along the first direction X to the display area DA and they are arranged along the second direction Y.

The sub-pixels SP each comprise memory devices 10 and pixel electrodes PE formed on the first substrate SUB1. The memory devices 10 store digital signals supplied to the respective signal lines S. The pixel electrodes PE oppose a common electrode CE formed on the first substrate SUB1 or the second substrate SUB2. The common electrode CE is formed to be common to a plurality of sub-pixels SP.

The control unit 2 comprises an AC drive circuit 20 which produces AC voltage and a clock circuit 21 which produces a clock signal. The AC drive circuit 20 and the common electrode CE are connected via a common voltage line LCM. The clock signals produced by the clock circuit 21 are supplied to each of the driver units 3 and 4. To the control unit 2, a power supply circuit 100 is connected to power source voltages VDD1, VDD2, and the like, which will be described later. The power supply circuit 100 is provided, for example, outside the display device 1, and is connected to the display device 1 via a flexible wiring board or the like. Note that the power supply circuit 100 may be provided in the display device 1. The power supply circuit 100 is a set of circuits which generate a plurality of voltages, for example. These circuits may be arranged as a set to form one device, or separately distributed at a certain distance.

FIG. 3 is a diagram showing an example of an equivalent circuit to a sub-pixel SP. In each sub-pixel SP, the pixel electrode PE, the memory device 10, a display select circuit 11 and a memory control circuit 12 are arranged.

The display select circuit 11 comprises a switching element Q1 an input terminal of which is connected to a first drive line DL1 and a switching element Q2 an input terminal of which is connected to a second drive line DL2. Output terminals of the switching elements Q1 and Q2 are connected to a pixel electrode PE via a select signal line 11a. To the first drive line DL1, for example, a first drive signal xFRP, which is a display voltage of an image, is supplied from the AC drive circuit 20 described above. To the second drive line DL2, a second drive signal FRP, which is a non-display voltage of an image, is supplied from the AC drive circuit 20. For example, the second drive signal FRP is a AC voltage of the same potential as that of the common voltage VCOM to be supplied to the common voltage line LCM, and the first drive signals FRP is an AV voltage antiphase to the common voltage VCOM.

The memory device 10 comprises switching elements Q3 to Q6. To input terminals of the switching elements Q3 and Q5, a first power line LP1 is connected. To the first power line LP1, a power source voltage VRAM is supplied from the second circuit unit 40. To input terminals of the switching elements Q4 and Q6, a second power line LP2 is connected, to which the voltage VSS is supplied. The switching elements Q3 and Q4 form a first inverter whose output terminal is connected to a control terminal of the switching element Q2, and the switching elements Q5 and Q6 form a second inverter whose output terminal is connected to a control terminal of the switching element Q1. These inverters are connected parallel in opposite directions, thus selectively turning on one of the switching elements Q1 and Q2.

The first circuit unit 30 supplies a digital signal SIG to the signal line S. The digital signal SIG is a voltage to be stored in the memory device 10, and is set to a high potential (H) level or a low potential (L) level. The memory control circuit 12 is a circuit which stores the digital signal SIG supplied to the signal line S in the memory device 10 and comprises a switching element Q7. An input terminal of the switching element Q7 is connected to the signal line S, and an output terminal thereof is connected to control terminals of the switching elements Q3 and Q4. To a control terminal of the switching element Q7, a scanning line G is connected. To the scanning line G, a scanning signal GATE is supplied from the second circuit unit 40.

All of the switching elements Q1 to Q7 are, for example, thin film transistors and formed on the first substrate SUB1. The first drive line DL1, the second drive line DL2, the first power line LP1, the second power line LP2 and the scanning line G as well are formed on the first substrate SUB1, and connected to a plurality of sub-pixels SP arranged along the first direction X.

In this embodiment, the display select circuit 11 and the memory control circuit 12 are each formed only from a single channel transistor. The term "single channel transistor" used here is meant a switching element which produces an output by gate voltage and one input voltage (source voltage) as an nMOS transistor or a pMOS transistor. That is, a single channel transistor does not include a CMOS type switching element including both an nMOS transistor and a pMOS transistor.

In the example of FIG. 3, the switching elements Q1, Q2 and Q7 included in the display select circuit 11 and the memory control circuit 12 are each an nMOS transistor. The switching elements Q1, Q2, and Q7 may be pMOS transistors as well. In the memory device 10 shown in FIG. 3, the switching element Q3 and Q5 are pMOS transistors, and the switching element Q4 and Q6 are nMOS transistors.

When the display select circuit 11 and the memory control circuit 12 are each formed into a single channel type, the number of the transistors contained in a sub-pixel SP can be reduced as compared to the case where CMOS switching elements adopted for these circuits. More specifically, when the switching elements Q1, Q2, and Q7 are of the CMOS type, six transistors are required for the display select circuit 11 and the memory control circuit 12, whereas in the example of FIG. 3, three transistors may be sufficient. Moreover, when the switching elements are miniaturized, the display select circuit 11 and the memory control circuit 12 are downsized. Consequently, the definition of the display device 1 is improved and the size thereof is reduced.

In the example of FIG. 3, the circuit of the sub-pixel SP is operated by a first voltage VDD1, a second voltage VDD2, which is higher than the first voltage VDD1, and a third voltage VSS at a ground potential (VSS<VDD1<VDD2).

The digital signal SIG comprises the third voltage VSS, which is at an L level and the first voltage VDD1, which is at an H level. The scanning signal GATE comprises the second voltage VDD2 and the third voltage VSS. The power source voltage VRAM comprises the first voltage VDD1 and the second voltage VDD2. The voltage supplied to the second power line LP2 is the third voltage VSS and constant. Each of the drive signals FRP and xFRP comprises the first voltage VDD1 and the third voltage VSS.

In an nMOS transistor, the gate voltage supplied to the control terminal needs to be higher than the source voltage supplied to the input terminal by only a predetermined threshold voltage Vth. The second voltage VDD2 is higher than the first voltage VDD1 by a threshold voltage Vth of the switching elements Q1, Q2 and Q7 or higher (VDD2≥VDD1+Vth). For example, the first voltage VDD1 is 3.0V, the second voltage VDD2 is 4.5V, and the third voltage VSS is 0V.

With the above-described configuration, the display device 1 can drive each of the sub-pixels SP in a digital mode. The digital mode is a system which controls the brightness of a sub-pixel SP in monochrome simply by ON/OFF based on the digital signal stored in the memory device 10. The following descriptions will be made on an assumption that the display device 1 is in the normally black mode, and a sub-pixel SP is turned on (white display) when the memory device 10 stores the H-level voltage, whereas it is turned off (black display) when the memory device 10 stores the L-level voltage.

In the digital mode, a write period in which the digital signal SIG supplied to the signal line S is written to the memory device 10, and a holding period in which one of the first drive signal xFRP and the second drive signal FRP, which corresponds to the voltage stored in the memory device 10 is selectively supplied to the pixel electrode PE are repeated.

In the following descriptions, a group of sub-pixels SP arranged along the first direction X in the display area DA are called a horizontal line. In a storage period, scanning pulses are supplied sequentially to the scanning line G and the digital signals SIG of the horizontal line corresponding to the scanning line G to which the scanning pulses are supplied are supplied sequentially to the signal lines S. Thus, the digital signals SIG according to image data are written sequentially to the memory devices 10 for each horizontal line.

The operation of the display device 1 will be described with reference to FIGS. 3 and 4. FIG. 4 is a timing chart of the holding period and the write period. This timing chart illustrates, while focusing on the sub-pixel SP shown in FIG. 3, changes in the scanning signal GATE, the power source voltage VRAM, the digital signal SIG, a holding voltage MEM of and the memory device 10, the first drive signal xFRP, the second drive signal FRP, the pixel voltage PIX of the pixel electrode PE and the common voltage VCOM over the holding periods 1 and 2 and the write period therebetween. It is assumed here that the sub-pixel SP is turned off in the holding period 1 and it is turned on in the holding period 2.

Each of the drive signals xFRP and FRP and the common voltage VCOM is an AC signal which varies between the voltages VDD1 and VSS at a predetermined cycle. When a potential difference is created between the pixel voltage PIX and the common voltage VCOM, the sub-pixel SP is turned on, and when not created, the sub-pixel SP is turned off.

In the holding period 1, the scanning signal GATE is at the third voltage VSS. Since the switching element Q7 is turned off at this time, the digital signal SIG of the signal line S is not supplied to the memory device 10. Therefore, the memory device 10 maintains the already stored holding voltage MEM.

In the holding period 1, the power source voltage VRAM is at the second voltage VDD2. In the example of FIG. 4, the holding voltage MEM is the third voltage VSS, which corresponds to black display in the holding period 1. At this time, the memory device 10 supplies the second voltage VDD2 of the first power line LP1 to the switching element Q2, and the third voltage VSS of the second power line LP2 to the switching element Q1. Thus, the switching element Q2 is turned on and the switching element Q1 is turned off. Via the switching element Q2, which is turned on, and the select signal line 11a, the second drive line DL2 and the pixel electrode PE are electrically connected to each other to supply the second drive signal FRP of the second drive line DL2 to the pixel electrode PE. Therefore, in the holding period 1, the pixel voltage PIX is at the same voltage as that of the second drive signal FRP.

During the holding period 1, the pixel voltage PIX and the common voltage VCOM are the same as each other, and thus no potential difference is created between the pixel electrode PE and the common electrode CE. Therefore, the sub-pixel SP displays black.

In the write period, the scanning signal GATE increases to the second voltage VDD2. Thus, the switching element Q7 is turned on and the digital signal SIG of the signal line S is supplied to the memory device 10. Further, in the write period, the power source voltage VRAM decreases to the first voltage VDD1. In this example, the digital signal SIG is at the first voltage VDD1, which is the H level, the holding voltage MEM of the memory device 10 is the first voltage VDD1, which is the same as the power source voltage VRAM.

When the holding voltage MEM is the first voltage VDD1, the memory device 10 supplies the first voltage VDD1 to the switching element Q1 and the third voltage VSS to the switching element Q2. Thus, the switching element Q1 is turned on and the switching element Q2 is turned off. Via the switching element Q1, which is turned on, and the select signal line 11a, the first drive line DL1 and the pixel electrode PE are electrically connected to each other to supply the first drive signal xFRP of the first drive line DL1 to the pixel electrode PE.

Note that in the write period, the gate voltage of the switching element Q1 is the first voltage VDD1 and the H-level voltage of the first drive signal xFRP supplied to the input terminal is also the first voltage VDD1. Therefore, during the period where the first drive signal xFRP is the first voltage VDD1, the gate voltage of the switching element Q1, which is an nMOS transistor, is lower than the sum of the source voltage and the threshold voltage Vth. In this case, the output voltage of the switching element Q1 decreases, and the pixel voltage PIX decreases to lower than the first voltage VDD1 as shown in FIG. 4. Consequently, a sufficient potential difference is not created between the pixel voltage PIX and the common voltage VCOM, and therefore the sub-pixel SP displays a white darker than usual.

In the holding period 2, the scanning signal GATE decreases to the third voltage VSS. Thus, the switching element Q7 is turned off. Further, the power source voltage VRAM increases to the second voltage VDD2. Thus, the holding voltage MEM rises to the second voltage VDD2.

When the holding voltage MEM rises to the second voltage VDD2, the voltage supplied to the switching element Q1 from the memory device 10 becomes the second voltage VDD2, which is higher than the first voltage VDD1 by the threshold voltage Vth or higher. In this case, the output voltage does not fall in the switching element Q1. Therefore, the pixel voltage PIX is at the same as that of the first drive signal xFRP (the first voltage VDD1 in FIG. 4). Here, a sufficient potential difference is created between the pixel voltage PIX and the common voltage VCOM, the sub-pixel SP well displays white.

In this embodiment, the power source voltage VRAM is decreased to the first voltage VDD1 in the write period. If the power source voltage VRAM is constantly set to the second voltage VDD2, the number of power sources required to drive the sub-pixel SP increases.

That is, if the power source voltage VRAM in the write period is the second voltage VDD2, the memory device 10 cannot not be driven as long as the voltage supplied through the switching element Q7 is the second voltage VDD2 or higher. Therefore, it is necessary to set the H-level voltage of the digital signal SIG to the second voltage VDD2 at the lowest. In this case, in order to normally operate the switching element Q7 which is a nMOS transistor, the voltage of the scanning signal GATE in the write period must be a fourth voltage (for example, 6.0V) which is higher than the second voltage VDD2. Thus, three power sources of the voltages VDD1, VDD2 and the fourth voltage are required to drive a sub-pixel SP. However, in this embodiment, the fourth voltage is not required, and therefore, the number of power sources required to drive sub-pixels SP can be reduced.

In addition, as described above, in the write period, a sufficient potential difference is not created between the pixel voltage PIX and the common voltage VCOM. This may result in an adverse effect of flicker in which the brightness of a sub-pixel SP decreases in a write period. The flicker can be made unrecognizable to user by raising the frequency of the write period. However, if the frequency of the write period is excessively increased, the power consumption of the display device 1 increases since the memory device 10 is then frequently rewritten. Moreover, if the frequency of the write period is excessively increased, the memory device 10 can no longer store the potential sufficiently in some cases. From these viewpoints, the frequency of the write period should preferably be set to, for example, 20 Hz to 80 Hz. It is further preferably if the frequency is set to 40 Hz to 80 Hz. Within the above-specified range of frequency, flickers are hardly recognizable while suppressing the power consumption.

In the memory device 10 including the CMOS configuration, when the middle gate voltage between two power source voltages (VSS and VRAM) is input, some of the switching elements Q3 to Q6 may be short-circuited to allow a through current to flow. This phenomenon is applicable to the case where, for example, while the switching element Q7 is on, the digital signal SIG is at the first voltage VDD1 and the power source voltage VRAM is the second voltage VDD2. In order to prevent such short-circuiting, the power source voltage VRAM needs to be set reliably to the first voltage VDD1 during the period where the scanning signal GATE is at the second voltage VDD2 (the period where the switching element Q7 is on).

In the example of FIG. 4, certain periods T1 and T2, in which the power source voltage VRAM is the first voltage VDD1, are provided before and after the write period so as to prevent generating the through current. More specifically, the power source voltage VRAM is lowered to the first voltage VDD1 only a period T1 before the timing at which the scanning signal GATE rises to the second voltage VDD2 in the write period. Further, after the elapse of a period T2 from the timing at which the scanning signal GATE falls to the third voltage VSS, the power source voltage VRAM is raised to the second voltage VDD2. The period T1 may be the same as the period T2 in length, but the period T2 should preferably be longer.

Next, a configuration example of the second circuit unit 40 will be described with reference to FIG. 5. The second circuit unit 40 comprises a first shift-register circuit 41, a first voltage select circuit 42 and a second voltage select circuit 43. The first shift-register circuit 41 and each of the voltage select circuits 42 and 43 are connected to each other by two first connection lines CL1.

To the first shift-register circuit 41, the voltages VSS and VDD2 and a clock signal VCK supplied from the clock circuit 21 are input. The first shift-register circuit 41 outputs output signals OUT and xOUT via the respective first connection lines CL1.

The first voltage select circuit 42 comprises switching elements Q10 and Q11. To control terminals of the switching elements Q10 and Q11, the output signal OUT is supplied. To an input terminal of the switching element Q10, the second voltage VDD2 is supplied, and to an input terminal of the switching element Q11, the first voltage VDD1 is supplied. Output terminals of the switching elements Q10 and Q11 are at the power source voltage VRAM, and are connected to a sub-pixel SP via the first power line LP1.

As described above, the second voltage select circuit 43 comprises switching elements Q12 to Q16. To control terminals of the switching elements Q12 and Q13, the output signal OUT is supplied. To a control terminal of the switching element Q14, the output signal xOUT is supplied. To an input terminal of the switching element Q12, the second voltage VDD2 is supplied, and an enable signal xENB is supplied to input terminals of the switching elements Q13 and Q14 from a voltage switch line VL.

The output terminals of the switching elements Q12 to Q14 are connected to the control terminals of the switching elements Q15 and Q16. To the input terminal of the switching element Q15, the second voltage VDD2 is supplied and the third voltage VSS is supplied to the input terminal of the switching element Q16. The output terminals of the switching elements Q15 and Q16 are at output voltage of the scanning signal GATE and are connected to the sub-pixel SP via the scanning line G. That is, the second voltage select circuit 43 controls the switching element Q15 and Q16 utilizing the voltage of the voltage switch line VL to supply the second voltage VDD2 or the third voltage VSS to the scanning line G.

Figure 5:
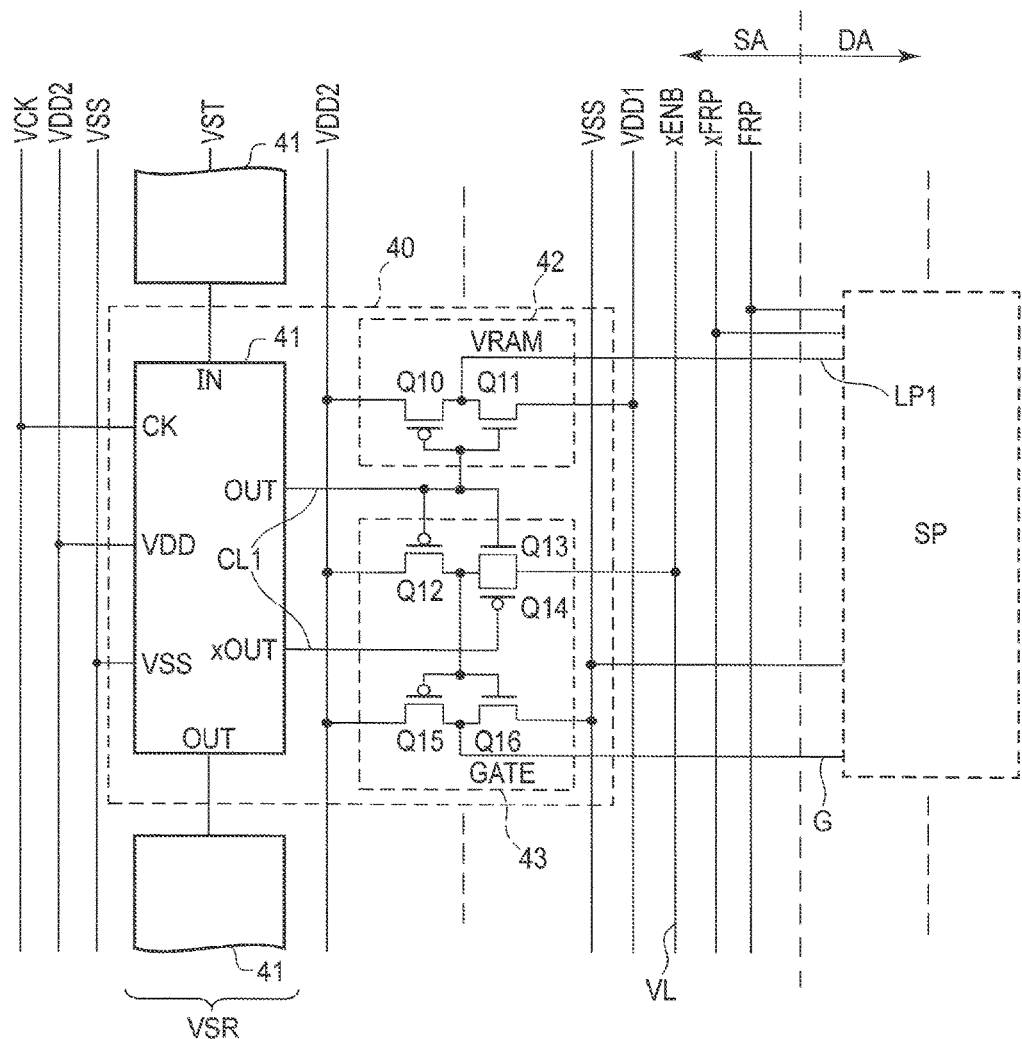
FIG. 5 is a diagram showing a configuration example of a second circuit unit of the display device.

In FIG. 5, the switching element Q11 is set to ON by the output signals OUT and xOUT and the power source voltage VRAM falls to the second voltage VDD1. On the other hand, the switching element Q13 and the switching element Q14 are also set to ON by the output signals OUT and xOUT. But, even if the switching element Q13 and Q14 are set to ON, the scanning signal GATE is not set to the second voltage VDD2 unless the enable signal xENB is at a voltage which turns the switching element Q15 on.

In this embodiment, after outputting the output signals OUT and xOUT, the switching element Q15 sets the enable signal xENB to an ON voltage (that is, decreasing the high voltage to the low voltage). Thus, after the power source voltage VRAM falls to the first voltage VDD1, the scanning voltage GATE raises to the second voltage VDD, and the period T1 is set. Further, before stopping the outputting of the output signals OUT and xOUT, the switching element Q15 sets the enable signal xENB to an OFF voltage (that is, increasing from the low voltage to the high voltage). Thus, before the power source voltage VRAM rises to the first voltage VDD2, the scanning voltage GATE falls to the third voltage VSS and the period T2 is set. As described above, the second voltage select circuit 43 controls the timing of changing the voltage of the enable signal xENB and thus the predetermined periods T1 and T2 shown in FIG. 4 are set.

The switching elements Q10, Q12, Q14 and Q15 are pMOS transistors and the switching elements Q11, Q13, and Q16 are nMOS transistors. With this arrangement, the switching elements Q10 and Q11 form an inverter, the switching elements Q13 and Q14 form a CMOS switch with a shared input terminal, and the switching elements Q15 and Q16 form a buffer. Note that the configuration of each of the voltage select circuits 42 and 43 discussed here is merely an example and various other modes can be adopted here. For example, the first voltage select circuit 42 may comprise a CMOS switch in place of the inverter comprising the switching elements Q10 and Q11.

The first shift register circuit 41 is connected to first shift register circuits 41 of second circuit units 40 of one preceding and one subsequent stages. The first shift register circuits 41 of these continuous stages transmit shift pulses sequentially according to the clock signal VCK. Thus, the write period to the memory device 10 is shifted sequentially between the horizontal lines. If a shift pulse is transmitted to the first shift register circuit 41 of the last stage, a start signal VST is supplied to transfer a shift pulse again from the first shift register circuit 41 of the uppermost stage.

When it is not yet the time to write to a corresponding horizontal, that is, during a holding period, the first shift register circuit 41 sets the output signal OUT to the L level and the output signal xOUT to the H level. At this time, in the first voltage select circuit 42, the switching element Q10 is turned on and the switching element Q11 is turned off. Therefore, the power source voltage VRAM is set to the second voltage VDD2 to be supplied to the input terminal of the switching element Q10.

On the other hand, when it is the time to write to a corresponding horizontal line, that is, during a write period, the first shift register circuit 41 sets the output signal OUT to the H level and the output signal xOUT to the L level. At this time, in the first voltage select circuit 42, the switching element Q11 is turned on and the switching element Q10 is turned off. Therefore, the power source voltage VRAM is set to the first voltage VDD1 to be supplied to the input terminal of the switching element Q11.

Further, during a holding period, the switching element Q12 is turned on and the switching element Q13 and Q14 are turned off in the second voltage select circuit 43. Therefore, the voltages at the control terminals of the switching elements Q15 and Q16 are set to the second voltage VDD2 to be supplied to the input terminal of the switching element Q12. In this case, the switching element Q15 is turned off and the switching element Q16 is turned on. Therefore, the scanning signal GATE is set to the third voltage VSS to be supplied to the input terminal of the switching element Q16.

On the other hand, during a write period, the switching element Q13 and Q14 are turned on and the switching element Q12 is turned off in the second voltage select circuit 43. Therefore, the voltages at the control terminals of the switching elements Q15 and Q16 are set to the voltage of the enable signal xENB to be supplied to the input terminals of the switching elements Q13 and Q14. The enable signal xENB is set to the L level in a write period. In this case, the switching element Q16 is turned off and the switching element Q15 is turned on. Therefore, the scanning signal GATE is set to the second voltage VDD2 to be supplied to the input terminal of the switching element Q15.

Thus, in the example of FIG. 5, the first voltage select circuit 42 selects the power source voltage VRAM from the voltages VDD1 and VDD2, and the second voltage select circuit 43 selects the voltage of the scanning signal GATE from the voltages VSS and VDD2. These operations are performed in synchronism with the clock signal VCK and the shift pulses input to the first shift register circuit 41. With this configuration, separate clock signals or shift registers are not required to operate each of the voltage select circuits 42 and 43, and therefore it becomes possible to reduce the number of elements of the peripheral circuits.

The first shift register circuit 41 of each stage forms a first shift register VSR which selects a specific scanning line G from a plurality of scanning lines G and supplies the second voltage VDD2 thereto.

Note that the power source voltage VRAM and the scanning signal GATE supplied respectively from the voltage select circuits 42 and 43 are supplied to each respective one of the sub-pixels SP of the same horizontal line. Therefore, the switching element Q10, Q11, Q15, and Q16 are required to have high drive capability. The drive capability of these switching elements Q10, Q11, Q15 and Q16 can be raised by increasing the ratio of a channel width W to a channel length L, that is, W/L. The channel width W is the length of the gate line along its extending direction in an overlapping region (channel region) of the semiconductor layer of the switching element, which is, for example, a thin film transistor and the gate line. The channel length L is the length of the gate line along its width direction in the overlapping region. For example, W/L in the switching elements Q10, Q11, Q15 and Q16 is greater than that of the switching elements Q1 to Q7 provided in a sub-pixel SP.

As shown in FIG. 1, in this embodiment, the driver units 3 and 4 are each formed into an arc shape along the display area DA. Further, at least a portion of the first driver unit 3 is arranged between the second driver unit 4 and the display area DA as in the first area A1. With such a configuration, it is necessary in the first area A1 to pass wirings lines which extend from the second driver unit 4 to the display area DA, including the scanning line G, through the area of the first driver unit 3. Moreover, if the driver units 3 and 4 are formed into an arc shape, it is necessary to bend the lines in these driver units accordingly. In view of the above, the circuit layout of the driver units 3 and 4 needs to be improved efficiently.

Figure 6:
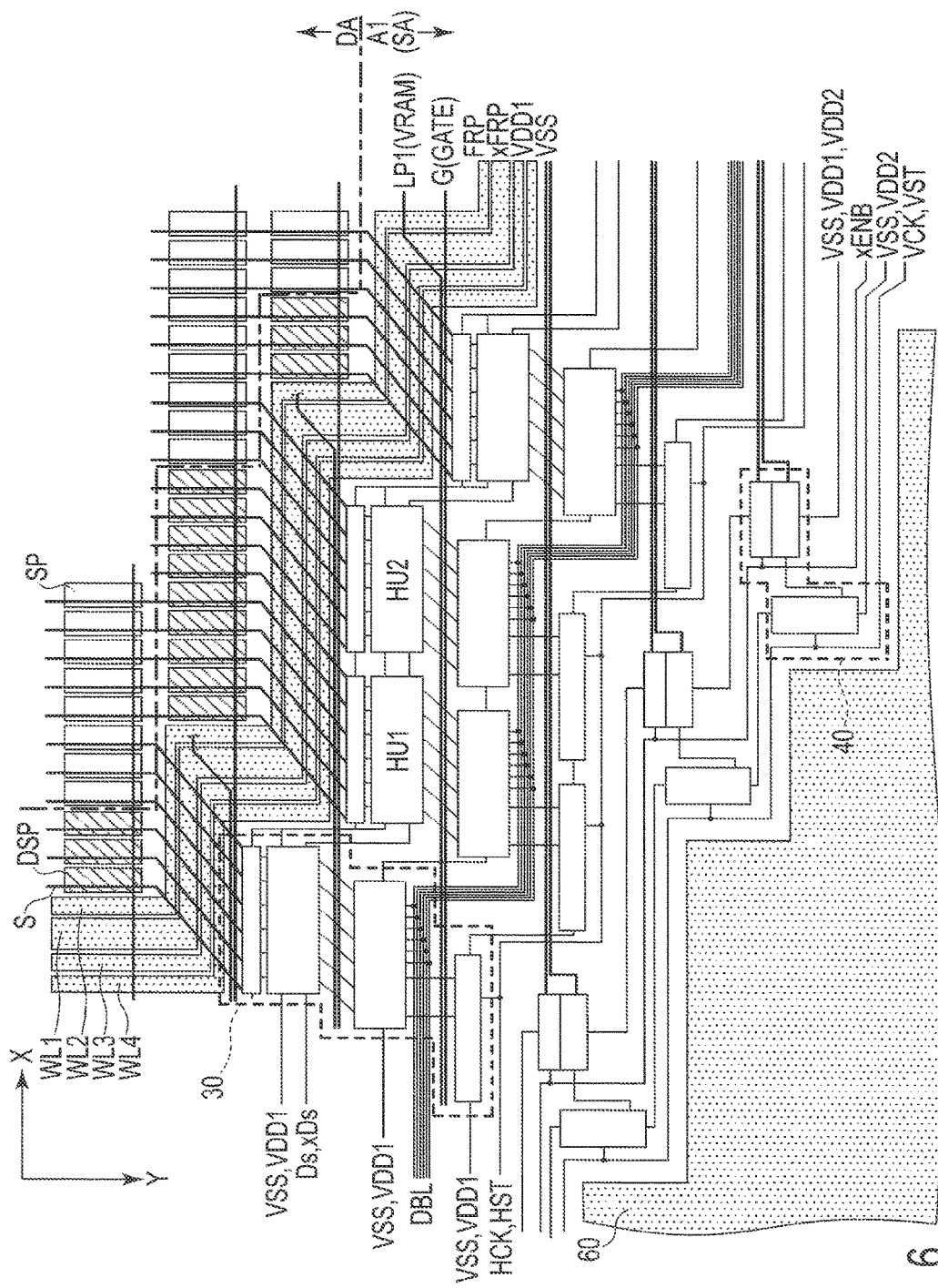
FIG. 6 is a diagram showing a circuit layout applicable to a first area in FIG. 1.

FIG. 6 shows an example of the circuit layout applicable to the first area A1. This figure shows some of the sub-pixels SP arranged in the display area DA in addition to the first area A1 (peripheral area SA). In FIG. 6, four of the first circuit units 30 and three of the second circuit units 40 are shown. Between the first circuit unit 30 and the display area DA, a first wiring line WL1 and a second wiring line WL2 extend, to which the first drive signal xFRP and the second drive signal FRP are respectively supplied. To the first wiring line WL1, a first drive line DL1 shown in FIG. 3, for example, is connected. To the second wiring line WL2, a second drive line DL2 shown in FIG. 3, for example, is connected. In the example of FIG. 6, further, a third wiring line WL3 and a fourth wiring line WL4 extend between the first circuit unit 30 and the display area DA, to which the first voltage VDD1 and the third voltage VSS are respectively supplied. The voltages VDD1 and VSS of the wiring lines WL3 and WL4 are also supplied to the sub-pixels SP and used to drive the memory device 10. The wiring lines WL1 to WL4 are bent along the display area DA. In FIG. 6, the wiring lines WL1 to WL4 are bent step-wise and the number of the first circuit units 30 differs from one stage to another. More specifically, there are two (HU1 and HU2) of the first circuit units 30 corresponding to the stage of the wiring lines WL1 to WL4 located in the center of FIG. 6. On the other hand, there is one first circuit unit 30 corresponding to a stage adjacent to the stage. Thus, the spatial efficiency can be improved by changing the number of the first circuit units 30 between the stages.

To the peripheral area SA, a guard ring 60, to which the common voltage VCOM is supplied, is provided, for example, annularly along the outer circumference edge of the peripheral area SA. The guard ring 60 serves to prevent static, etc. supplied from the outside from affecting the circuits in the peripheral area SA. The circuit units 30 and 40 are arranged between the guard ring 60 and the display area DA.

Between the first wiring line WL1 and the display area DA, dummy pixels DSP are arranged along with the outline of the display area DA. The dummy pixels DSP are of the same shape as that of the sub-pixels SP as seen in plan view, for example, and are arranged at the same pitch as that of the sub-pixels SP. For example, the dummy pixels DSP each comprise a pixel electrode PE and a display select circuit 11, but do not include a memory device 10 at least. To the pixel electrode PE of each dummy pixel DSP, the second drive signal FRP, which is always at the non-display voltage, is supplied. That is, the dummy pixels DSP are pixels which display black at all times and do not display images.

There are a plurality of signal lines S (pixel rows) driven by one first circuit unit 30, and in FIG. 6, there are six of them. Between the six signal lines S, the number of dummy pixels DSP connected thereto differs from one to another. Moreover, as in HU1 and HU2 illustrated (both being the first circuit units 30), when any adjacent pairs of first circuit units 30 are compared, the average number of dummy pixels DSP connected to the signal lines S differs from each other. In the entire edge of the display area DA, the dummy pixels DSP are irregularly arranged to fill the space between the first wiring line W1 and the display area DA.

Figure 7:
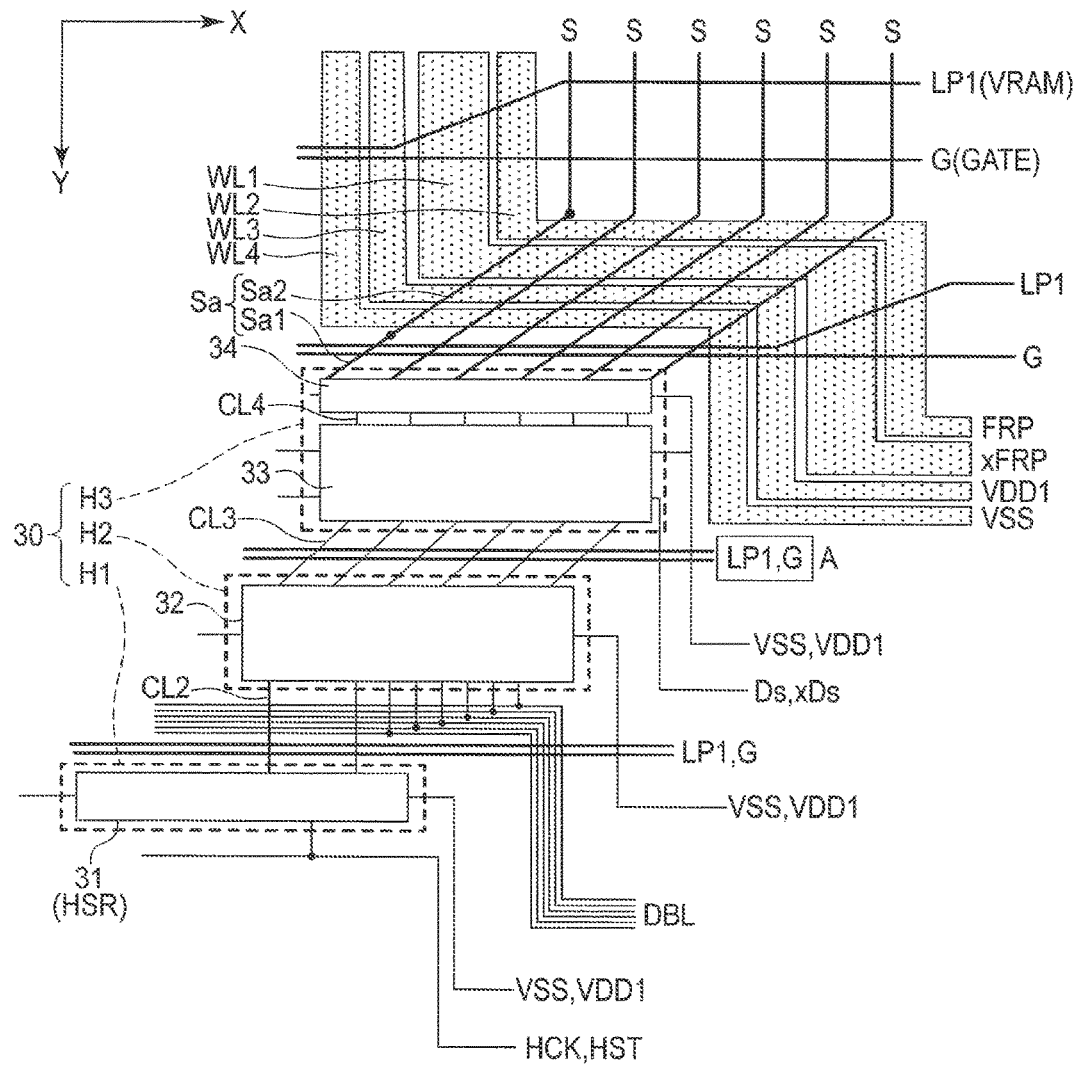
FIG. 7 is an enlarged diagram showing a first circuit unit in FIG. 6.
Figure 8:
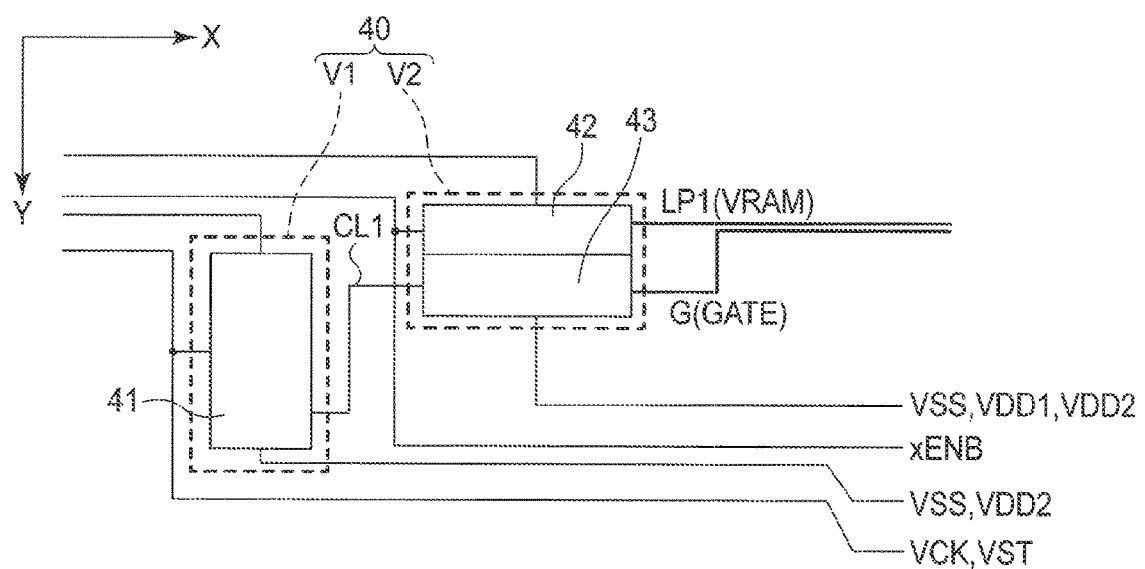
FIG. 8 is an enlarged diagram showing s second circuit unit in FIG. 6.

FIG. 7 is an enlarged diagram showing the first circuit unit 30 of FIG. 6, and FIG. 8 is an enlarged diagram showing the second circuit unit 40 of FIG. 6. The first circuit unit 30 shown in FIG. 7 comprises a horizontal circuit H1 (the first circuit), a horizontal circuit H2 (the second circuit) and a horizontal circuit H3 (the third circuit). The horizontal circuit H1 includes a second shift register circuit 31. The horizontal circuit H2 includes a first latch circuit 32. The horizontal circuit H3 includes a second latch circuit 33 and a buffer circuit 34. The horizontal circuits H1 and H2 are connected to each other with a second connection line CL2, and the horizontal circuits H2 and H3 are connected to each other with a third connection line CL3. Moreover, in the horizontal circuit H3, the second latch circuit 33 and the buffer circuit 34 are connected to each other with a fourth connection line CL4.

To the second shift register circuit 31, connected are wiring lines which supply the voltages VSS and VDD1, a clock signal HCK and a start signal HST to the horizontal circuit H1. To the first latch circuit 32, a wiring line which supplies the voltages VSS and VDD1 to the horizontal circuit H2 is connected. To the second latch circuit 33 and the buffer circuit 34, wiring lines which supply the voltages VSS and VDD1 and the timing pulses Ds and xDs to the horizontal circuit H3 are connected. Note that in FIGS. 6 and 7, these wiring lines connected to the horizontal circuits H1 to H3 are represented by one line segment for simplification.

The second shift register circuit 31 is connected to the second shift register circuits 31 of the first circuit units 30 located in the one previous and subsequent stages. The second shift register circuits 41 of the stages transfer the shift pulses sequentially according to the clock signals HCK.

When the shift pulse is transmitted to the second shift register circuit 31 of the last stage, the start signal HST is supplied to again transmit a shift pulses from the second shift register circuit 31 of the uppermost stage.

The first latch circuit 32 is connected to a data bus DBL. In the example of FIG. 7, the data bus DBL includes six wiring lines to which video data to be output to the six signal lines S are supplied. The first latch circuit 32 latches the video data supplied to the respective wiring lines of the data bus DBL. When a shift pulse is input to the second shift register circuit 31, the first latch circuit 32 outputs the latched video data to the second latch circuit 33. The second latch circuit 33 is controlled by the timing pulses Ds and xDs and latches video data outputted from the first latch circuit 32. The buffer circuit 34 outputs the digital signal SIG corresponding to the video data latched by the second latch circuit 33 to the signal line S.

The second shift register circuit 31 of each stage forms a second shift register HSR which selects a specific signal line S from a plurality of signal lines S and supplies a digital signal SIG thereto.

The second circuit unit 40 shown in FIG. 8 comprises a vertical circuit V1 (the fourth circuit) and a vertical circuit V2 (the fifth circuit). The vertical circuit V1 includes the first shift register circuit 41 described above. The vertical circuit V2 includes the first voltage select circuit 42 and the second voltage select circuit 43, described above. The vertical circuit V1 and V2 are connected to each other with the first connection line CL1 described above. To the first voltage select circuit 42, the first power line LP1 which supplies the power source voltage VRAM is connected, and to the second voltage select circuit 43, the scanning line G is connected.

To the first shift register circuit 41, connected are wiring lines which supply the voltages VSS, VDD2, a clock signal VCK and a start signal VST to the vertical circuit V1. To the vertical circuit V2, connected are wiring lines which supply the voltages VSS, VDD1 and VDD2 and enable signal xENB to the respective voltage select circuits 42 and 43. Note that in FIGS. 7 and 8, a plurality of wiring lines connected to the vertical circuit V1 and V2 are represented by one line segment for simplification.

As shown in FIG. 7, between the horizontal circuits H1 and H2, a scanning line G and the first power line LP1 connected to the second circuit unit 40 extend along the first direction X. To the scanning line G, the scanning signal GATE illustrated in FIG. 5 is supplied and to the first power line LP1 the power source voltage VRAM illustrated in FIG. 5 is supplied. Between the horizontal circuits H2 and H3, a scanning line G and the first power line LP1 connected to another second circuit unit 40 extend along the first direction X. Between the horizontal circuit H3 and fourth wiring line WL4, a scanning line G and the first power line LP1 connected to still another second circuit unit 40 extend along the first direction X. Furthermore, between the horizontal circuits H1 and H2, the data bus DBL extends along the first direction X.

In the example of FIG. 7, the first power line LP1 and the scanning line G (denoted by reference symbol A), which correspond to the same sub-pixel row, extend between the respective horizontal circuits. In other words, the first power line LP1 and the scanning line G corresponding to reference symbol A both extend between the first latch circuit 32 and the second latch circuit 33, thereby make the wiring line formation area compact.

The scanning line G, the first power line LP1 and the data bus DBL extending between the horizontal circuits H1 and H2 cross the second connection line CL2 as seen in plan view. The scanning line G and the first power line LP1 extending between the horizontal circuits H2 and H3 cross the third connection line CL3 as seen in plan view.

In the example of FIG. 7, the signal lines S and the buffer circuit 34 are connected to each other via draw-out lines Sa connected to the buffer circuit 34. The scanning line G and the first power line LP1 extending between the horizontal circuit H3 and the fourth wiring line WL4 cross the draw-out lines Sa as seen in plan view. Further, the wiring lines WL1 to WL4 as well each cross the draw-out lines Sa as seen in plan view.

The horizontal circuits H1 to H3 are arranged along the second direction Y. Further, the horizontal circuits H1 to H3 are displaced from each other along the first direction X. Here, such an expression, two circuits "are displaced from each other along the first direction X" is meant, for example, that a line segment connecting the center of one circuit along the first direction X and that of the other also along the first direction X is not parallel to the second direction Y.

In the example of FIG. 7, the positions of the signal line S and the horizontal circuit H3 (buffer circuit 34) are displaced from each other along the first direction X. The draw-out lines Sa extend to incline towards a direction in which they cross both of the first direction X and the second direction Y. Further, in the example of FIG. 7, the third connection line CL3 as well extends to incline towards a direction in which it crosses both of the first direction X and the second direction Y.

In the example of FIG. 8, the vertical circuits V1 and V2 are displaced from each other along the second direction Y, while they are arranged along the first direction X. Here, such an expression, two circuits "are displaced from each other along the second direction Y" is meant, for example, that a line segment connecting the center of one circuit along the second direction Y and that of the other also along the second direction Y is not parallel to the first direction X.

Thus, by displacing the horizontal circuits H1 to H3 and the vertical circuits V1 and V2, the space in the peripheral area SA can be utilized effectively in the arrangement of the circuit units 30 and 40. Note that in the case where there is already a sufficient space in the peripheral area SA, for example, it is also possible to adopt such a structure in which the horizontal circuits H1 to H3 and the vertical circuits V1 and V2 are not displaced from each other. Further, only either one set of the horizontal circuits H1 to H3 or the vertical circuits V1 and V2 may be displaced.

In addition, the wiring lines shown in FIG. 6 to FIG. 8 are formed of conductive materials such as metals and indium-tin-oxide (ITO), in the first and second layers of the first substrate SUB1, for example. An insulating layer is provided between the first and second layers. Of the two crossing wiring lines shown in FIGS. 6 to 8, one is formed in the first layer and the other is in the second layer. Therefore, these wiring lines are not electrically connected to each other.

For example, the scanning line G and the first power line LP1 are formed in the first layer, whereas the other lines including the signal line S, the wiring lines WL1 to WL4 and the data bus DBL are formed in the second layer. For example, the second connection line CL2 needs to avoid the scanning line G and the first power line LP1 formed in the first layer and the data bus DBL formed in the second layer. In such a case, it suffices only if the portion of the second connection line CL2, which crosses the scanning line G and the first power line LP1 are formed in the second layer, whereas that crosses the data bus DBL is formed in the first layer, and these two portion are connected via a contact hole formed in the insulating layer.

As shown in FIG. 7, the draw-out lines Sa includes a first portion Sa1 crossing the scanning line G and the first power line LP1 extending between the horizontal circuit H3 and the fourth wiring line WL4, and a second portion Sa2 crossing the wiring lines WL1 to WL4. The first portion Sa1 extends from the horizontal circuit H3 to a contact position between the first power line LP1 and the fourth wiring line WL4. The second portion Sa2 extends from the contact position to the signal line S. The first portion Sa1 is formed in the second layer so as to avoid the scanning line G and the first power line LP1 formed in the first layer. The second portion Sa2 is formed in the first layer so as to avoid the wiring lines WL1 to WL4 formed in the second layer. The first portion Sa1 and the second portion Sa2 are connected to each other at the contact position.

As can be seen in FIG. 7, if adopting such a structure that the draw-out lines Sa extend in parallel with the second direction Y to be connected to the signal line S locating ahead, a part of each draw-out line Sa must pass through the region where the scanning line G and the first power line LP1 and each of the wiring lines WL1 to WL4 cross each other. Here, the scanning line G and the first power line LP1 and each of the wiring lines WL1 to WL4 are formed in different layers so as to avoid electrical contact. Therefore, in order to allow the draw-out lines Sa to pass further to this region, a new layer is required for forming draw-out lines Sa. By contrast, when the draw-out lines Sa are inclined to avoid the region where the scanning line G and the first power line LP1 and each of the wiring lines WL1 to WL4 cross each other as shown in FIG. 7, it is not necessary to prepare a new layer.

Note that the example discussed above is directed to a case where the wiring lines are formed in two layers, respectively, that is, the first layer and the second layer. But, it is also possible to provide more layers in the first substrate SUB1 to distribute the wiring lines in these layers.

According to this embodiment of the above-described structure, the display select circuit 11, the memory control circuit 12 and the like are formed from single channel transistors only as described with reference to FIGS. 3 to 5, and therefore the number of the transistors contained in the circuits of a sub-pixel SP can be reduced. Thus, the circuits in each sub-pixel SP can be miniaturized, thereby making it possible to achieve a higher definition of the display device 1. Further, as described above, since the voltages VDD1 and VDD2 are selectively supplied to the first power line LP1, it is not necessary to increase the number of power sources. Therefore, the number of power supply lines can be reduced and a lower power consumption of the display device 1 can be achieved. Moreover, with devising the circuit configuration of the peripheral area SA as described with reference to FIGS. 6 to 8, the efficiency of the circuit layout of the peripheral area SA can be improved.

In addition to the above, the advantageous effects described above and other various effects can be obtained from this embodiment.

While one embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the inventions.

For example, the embodiment discloses a display device of a digital mode. But, the circuit layout of the peripheral area SA in the embodiment is applicable to an analog-mode display device which supplies analog video signals to pixel electrodes PE through signal lines S to display images of multi-gradation. Furthermore, the circuit layout of the peripheral area SA of this embodiment is also applicable to a display device having functions of both digital and analog modes.

Moreover, the configuration of the second circuit unit 40 shown in FIG. 5 and the circuit layout of the peripheral area SA shown in FIGS. 6 to 8 are each only an example. The circuit elements and wiring lines illustrated in these figures can be reduced as needed, or a new circuit element and/or wiring line may be added. Furthermore, the first circuit unit 30 may also include four or more horizontal circuits separated from each other, and may also include two horizontal circuits. Similarly, the second circuit unit 40 may also include three or more vertical circuits. The circuit elements contained in each of the horizontal circuits and the vertical circuits can be selected appropriately as needed.

Furthermore, FIG. 1 shows the display device 1 including a circular display area DA, but the structure disclosed in this embodiment is also applicable to display devices which include display areas of other shapes including a rectangle and the like.

Furthermore, the embodiment discusses, in an example, that the first voltage select circuit 42 changes the power source voltage VRAM in synchronism with the clock signal VCK or the like input to the first shift register circuit 41. But, the first voltage select circuit 42 may be operated independently from the first shift register circuit 41 by a clock signal other than the clock signal VCK of the first shift register circuit 41.

What is claimed is:

1. A display device comprising:
    a pair of substrates each including a display area where a plurality of pixels are arranged;
    an electro-optical layer located between the pair of substrates;
    a pixel electrode provided in each of the plurality of pixels;
    a display select circuit connected to the pixel electrode, which selectively supplies a display voltage and a non-display voltage to the pixel electrode;
    a first power line to which a first voltage and a second voltage are supplied;
    a memory device connected to the first power line and the display select circuit;
    a first voltage select circuit which selects a voltage to be supplied to the first power line from the first voltage and the second voltage;
    a clock circuit which generates a clock signal,
    a second power line connected to the memory device, to which a third voltage is supplied;
    a first drive line to which the display voltage is supplied; and
    a second drive line to which the non-display voltage is supplied,
    wherein
    the memory device controls the display select circuit using the first voltage and the second voltage,
    the first voltage select circuit selects the first voltage or the second voltage in synchronism with the clock signal, the memory device selectively supplies the first voltage, the second voltage, and the third voltage to the display select circuit, and the display select circuit electrically connects one of the first drive line and the second drive line to the pixel electrode using the voltage supplied from the memory device.

2. The display device of claim 1,
wherein
the memory device stores one of the first voltage, the second voltage and the third voltage, and when the first voltage or the second voltage is stored, the display voltage is supplied to the pixel electrode through the display select circuit, and when the third voltage is stored, the non-display voltage is supplied to the pixel electrode through the display select circuit.

3. A display device comprising:
a pair of substrates each including a display area where a plurality of pixels are arranged;
an electro-optical layer located between the pair of substrates;
a pixel electrode provided in each of the plurality of pixels;
a display select circuit connected to the pixel electrode, which selectively supplies a display voltage and a non-display voltage to the pixel electrode;
a first power line to which a first voltage and a second voltage are supplied;
a memory device connected to the first power line and the display select circuit;
a first voltage select circuit which selects a voltage to be supplied to the first power line from the first voltage and the second voltage;
a clock circuit which generates a clock signal;
a second power line connected to the memory device, to which a third voltage is supplied;
a plurality of signal lines to which a voltage to be stored in the memory device is supplied;
a switching element located between the signal line and the memory device; and
a plurality of scanning lines to which a scanning signal which controls the switching element is supplied,
wherein
the memory device controls the display select circuit using the first voltage, and the second voltage,
the first voltage select circuit selects the first voltage or the second voltage in synchronism with the clock signal,
the first voltage and the third voltage are selectively supplied to the plurality of signal lines, and
the second voltage and the third voltage are selectively supplied to the plurality of scanning lines.

4. The display device of claim 3, wherein
transistors contained in the switching element and the display select circuit are only single channel transistors.

5. The display device of claim 3, comprising:
a second voltage select circuit which selects the voltage supplied to the plurality of scanning lines;
a first shift register which, using the clock signal, selects a specific scanning line from the plurality of scanning lines and supplies a voltage thereto,
wherein
the first voltage select circuit and the second voltage select circuit are operated by using the voltage output from the first shift register.

6. The display device of claim 3, further comprising:
a plurality of first circuit units arranged in a peripheral area surrounding the display area, to which the plurality of signal lines are connected, respectively; and
a plurality of second circuit units arranged in the peripheral area and each including the first voltage select circuit,
wherein
the plurality of first circuit units each including a first circuit, a second circuit and a connection line which connects the first circuit and the second circuit to each other,
at least one of the plurality of first circuit units is disposed between at least one of the plurality of second circuit units and the display area, and
the scanning line extends between the first circuit and the second circuit to cross the connection line as seen in plan view.

7. The display device of claim 6, further comprising:
a first driver unit including the plurality of first circuit units and the plurality of second circuit units; and
a second driver unit disposed in the peripheral area, which supplies the plurality of scanning signals to the plurality of scanning lines, respectively,
wherein
at least a portion of the first driver unit is disposed between the display area and the second driver unit.

8. The display device of claim 6, further comprising:
a data bus to which data indicating voltages to be stored in the memory device of each of the plurality of pixels are supplied sequentially,
wherein
the data bus further extends between the first circuit and the second circuit to cross the connection line as seen in plan view.

9. The display device of claim 6, wherein
the plurality of scanning lines extend in the display area along a first direction, and
the first circuit and the second circuit are arranged along a second direction crossing the first direction, so as to be displaced from each other along the first direction.

10. The display device of claim 6, further comprising:
a draw-out line which connects the signal line and the first circuit unit to each other,
wherein
the plurality of scanning lines extend in the display area in the first direction,
the plurality of signal lines extend in the display area along a second direction crossing the first direction, and
the draw-out line extends in the peripheral area along a direction crossing both the first direction and the second direction.

11. A display device comprising:
a pair of substrates each including a display area in which a plurality of pixels are arranged;
an electro-optical layer located between the pair of substrates;
a pixel electrode provided in each of the plurality of pixels;
a display select circuit connected to the pixel electrode, which selectively supplies a display voltage and a non-display voltage to the pixel electrode;
a first power line to which a first voltage and a second voltage are supplied,
a memory device connected to the first power line and the display select circuit;

a plurality of signal lines to which a voltage to be stored in the memory device is supplied;
a switching element located between the signal line and the memory device; and
a first voltage select circuit which selects a voltage to be supplied to the first power line, from the first voltage and the second voltage,
wherein
the memory device stores, in a write period when the switching element is on, the voltage supplied to the signal line,
the memory device controls, in a holding period when the switching element is off, the display select circuit according to the voltage stored, and
the first voltage select circuit supplies the first voltage to the first power line in the write period, and the second voltage to the first power line in the holding period.

12. The display device of claim 11, further comprising:
a plurality of scanning lines to which a scanning signals which controls the switching element is supplied,
wherein
to the plurality of scanning lines, a third voltage is supplied in the holding period, and the second voltage is supplied in the write period, and
the first voltage select circuit supplies the first voltage to the first power line a predetermined time before a time when the voltage of the plurality of scanning lines changes from the third voltage to the second voltage.

13. The display device of claim 12, further comprising:
a second voltage select circuit which selects a voltage to be supplied to the scanning line;
a voltage switch line connected to the second voltage select circuit, which can switch the voltage to be supplied; and
a first shift register which selects a specific scanning line from the plurality of scanning lines and supplies the voltage thereto using a clock signal,
wherein
the first voltage select circuit and the second voltage select circuit are operated using the voltage output from the first shift register,
the second voltage select circuit supplies the third voltage or the second voltage to the scanning line using the voltage switch line, and
the voltage switch line switches the voltage of the voltage switch line after the first shift register outputs the voltage to the second voltage select circuit.

14. The display device of claim 11, further comprising:
a second power line connected to the memory device, to which a third voltage is supplied,
the memory device stores one of the first voltage, the second voltage and the third voltage, and when the first voltage or the second voltage is stored, the display voltage is supplied to the pixel electrode through the display select circuit, and when the third voltage is stored, the non-display voltage is supplied to the pixel electrode through the display select circuit.

15. The display device of claim 11, further comprising:
a second power line connected to the memory device, to which a third voltage is supplied;
a first drive line to which the display voltage is supplied; and
a second drive line to which the non-display voltage is supplied,
wherein
the memory device selectively supplies the first voltage, the second voltage and the third voltage to the display select circuit, and
the display select circuit electrically connects one of the first drive line and the second drive line to the pixel electrode based on the voltage supplied from the memory device.

16. The display device of claim 11, further comprising:
a plurality of scanning lines to which scanning signals which control the switching element are supplied;
a plurality of first circuit units arranged in a peripheral area surrounding the display area, to which the signal lines are connected, respectively; and
a plurality of second circuit units arranged in the peripheral area and each including the first voltage select circuit,
the plurality of first circuit units each include a first circuit, a second circuit and a connection line which connects the first circuit and the second circuit to each other,
at least one of the plurality of first circuit units is disposed between at least one of the plurality of second circuit units and the display area, and
the scanning line extends between the first circuit and the second circuit to cross the connection line.

17. The display device of claim 16, further comprising:
a first driver unit including the plurality of first circuit units and the plurality of second circuit units; and
a second driver unit disposed in the peripheral area, which supplies the plurality of scanning signals to the plurality of scanning lines, respectively,
wherein
at least a portion of the first driver unit is disposed between the display area and the second driver unit.

18. The display device of claim 16, further comprising:
a data bus to which data indicating voltages to be stored in the memory device of each of the plurality of pixels are supplied sequentially,
wherein
the data bus further extends between the first circuit and the second circuit to cross the connection line as seen in plan view.

19. The display device of claim 1, further comprising:
a plurality of signal lines to which a voltage to be stored in the memory device is supplied;
a switching element located between the signal line and the memory device; and
a plurality of scanning lines to which a scanning signal which controls the switching element is supplied.

20. The display device of claim 19, wherein
transistors contained in the switching element and the display select circuit are only single channel transistors.

* * * * *